United States Patent
Endo et al.

(10) Patent No.: US 8,231,167 B2
(45) Date of Patent: Jul. 31, 2012

(54) VEHICLE BODY SIDE STRUCTURE

(75) Inventors: Yoshihide Endo, Okazaki (JP); Koji Makino, Aichi-ken (JP); Shigeru Inamori, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 231 days.

(21) Appl. No.: 12/281,196

(22) PCT Filed: Mar. 1, 2007

(86) PCT No.: PCT/IB2007/000485
§ 371 (c)(1),
(2), (4) Date: Aug. 29, 2008

(87) PCT Pub. No.: WO2007/099440
PCT Pub. Date: Sep. 7, 2007

(65) Prior Publication Data
US 2009/0045650 A1   Feb. 19, 2009

(30) Foreign Application Priority Data
Mar. 3, 2006   (JP) ................................. 2006-058419

(51) Int. Cl.
*B62D 21/15*   (2006.01)
*B60J 5/04*   (2006.01)

(52) U.S. Cl. .................. 296/187.12; 296/146.6; 49/502

(58) Field of Classification Search ............... 296/146.6, 296/187.12; 49/502
See application file for complete search history.

(56) References Cited

U.S. PATENT DOCUMENTS

| | | | |
|---|---|---|---|
| 5,599,057 A | 2/1997 | Hirahara et al. | |
| 6,382,707 B1 | 5/2002 | Dunneback | |
| 6,969,107 B2 * | 11/2005 | Omori et al. | 296/146.6 |

FOREIGN PATENT DOCUMENTS

| | | |
|---|---|---|
| FR | 2 698 322 | 5/1994 |
| GB | 2 281 881 A | 3/1995 |
| JP | 56-170019 | 12/1981 |
| JP | 9-39569 | 2/1997 |
| JP | 9-175180 | 7/1997 |
| JP | 11-321498 | 11/1999 |
| JP | 3443620 | 6/2003 |
| WO | WO 2004/104125 A1 | 12/2004 |

OTHER PUBLICATIONS

Japanese Office Action dated Jan. 9, 2009.
First Office Action for Chinese Appl. No. 200780007657.9 dated Jan. 29, 2010.

* cited by examiner

*Primary Examiner* — Glenn Dayoan
*Assistant Examiner* — Melissa A Black
(74) *Attorney, Agent, or Firm* — Finnegan, Henderson, Farabow, Garrett & Dunner, LLP

(57) ABSTRACT

In a vehicle body side structure, an impact beam (116) is mounted to a door inner panel (110) by an impact beam extension (118). A part of the impact beam extension (118) that extends from an impact beam fixing part (126) to the door inner panel (110) serves as a load transmission part (128) capable of transmitting a load from the impact beam (116) to the door inner panel (110), and the extension line therefrom is directed at the centroid C2 of the body pillar (106). With a simple structure such as this, at the time of a side impact it is possible to transfer a load from the impact beam (116) in a straight line to the centroid C21 of the body pillar (106) while suppressing the twisting moment of the body pillar (106).

9 Claims, 15 Drawing Sheets

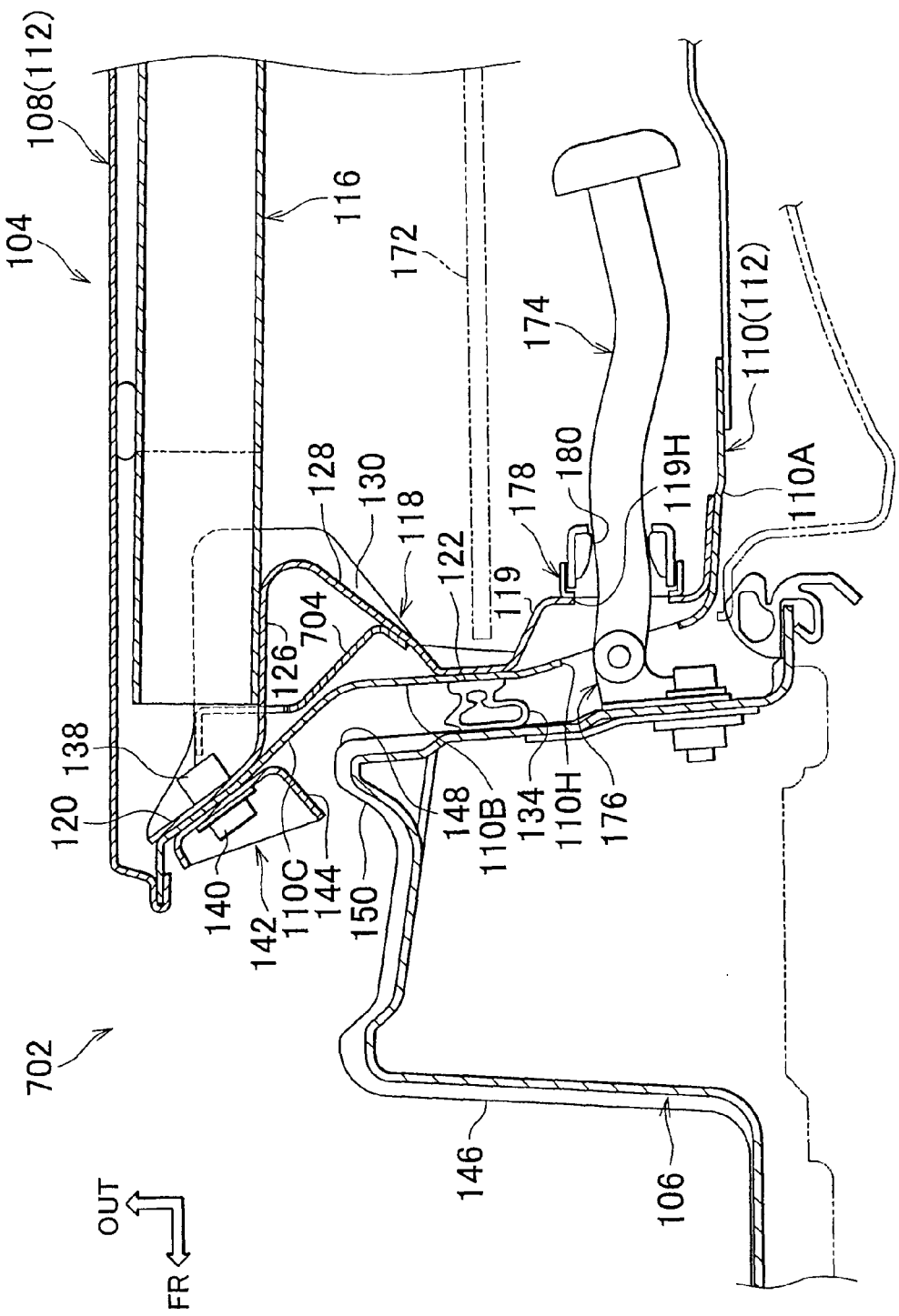

VEHICLE BODY SIDE STRUCTURE

CROSS-REFERENCE TO RELATED APPLICATIONS

This application is a national phase application of International Application No. PCT/IB2007/000485, filed Mar. 1, 2007, and claims the priority of Japanese Application No. 2006-058419, filed Mar. 3, 2006, the contents of both of which are incorporated herein by reference.

BACKGROUND OF THE INVENTION

1. Field of the Invention

The present invention relates to a vehicle body side structure.

2. Description of the Related Art

The side structure of a vehicle body, and particularly in the door structure thereof, for example as described in Japanese Patent 3443620, has an impact beam mounting structure in which the front edge and the rear edge of an impact beam are mounted to a door inner panel by an extension member.

In an actual vehicle body side structure, it is desirable that the load applied to the impact beam from outside, in the vehicle width direction, be reliably transmitted to the pillar. The additional provision of a load-transmitting member, however, increases in the complexity of the structure.

SUMMARY OF THE INVENTION

The present invention has an object to provide a vehicle body side structure capable of transmitting to the pillar a load applied to the impact beam with a simple structure.

A first aspect of the present invention is a vehicle body side structure having an impact beam disposed to extend in the longitudinal direction of the vehicle between an outer panel and an inner panel that form the door of a vehicle body, and an impact beam extension for mounting one end part of the impact beam to the inner panel, having an impact beam fixing part to which the impact beam is fixed, and a load transmission part extending from the impact beam fixing part toward the vehicle pillar.

The load transmission part extends at an angle facing the centroid of the vehicle body pillar.

Because the end part of the impact beam is fixed to the impact beam fixing part of the impact beam extension, the impact beam is mounted to the inner panel via the impact beam extension. Because the impact beam provided with a load transmission part that extends at an angle facing the centroid of the pillar of the vehicle body from the impact beam fixing part, it is possible to reliably transmit load applied to the impact beam to the pillar centroid. Furthermore, because the load transmission part is provided on the impact beam extension and it is not necessary to have a separate member for this load transmission, complexity of the structure is avoided and it is possible to have a simple structure.

The impact beam extension may have joining parts joined to the inner panel, provided at an outer end part and an inner end part of the impact beam extension in the vehicle widthwise direction, and an outwardly expanded part, provided at the center part of the impact beam extension in the vehicle widthwise direction, expanded outwardly in the vehicle widthwise direction away from the inner panel.

The impact beam fixing part is provided at a location on the outwardly expanded part at the outside in the vehicle widthwise direction.

That is, by the joining parts provided at the inner end part and the outer end part of the impact beam extension in the vehicle widthwise direction, it is possible to securely join the impact beam extension to the inner panel. Also, by an expanded part provided at the center part of the impact beam extension in the vehicle widthwise direction, it is possible to fix the end part of the impact beam at a desired location. For example, if a configuration is adopted in which the impact beam fixing part is provided at an outside position of the outwardly expanded part in the vehicle widthwise direction, it is possible to fix the end part of the impact beam at an outside position.

The load transmission part may be formed integrally with the impact beam fixing part.

Therefore, compared to a configuration in which there is discontinuity from the impact beam fixing part up until the load transmission part, it is possible to transmit a load from the impact beam to the pillar centroid with good efficiency.

In this impact beam extension, a reinforcing member may be provided in the impact beam extension at a part extending from the impact beam fixing part toward the load transmission part.

By doing this, it is possible to suppress deformation and the like of the load transmission part, and to transmit a load from the impact beam to the pillar centroid with further improved efficiency.

Additionally, in the impact beam extension, the impact beam fixing part may be integrally formed with the load transmission part, including the reinforcing member, and the reinforcing member may be formed at an angle facing the centroid of the pillar from the impact beam fixing part.

The vehicle body side structure may further have a mating bracket sandwiching the inner panel with the impact beam extension, wherein a surface located at the inside of the mating bracket in the vehicle widthwise direction is substantially parallel to an extension direction of the load transmission part of the impact beam extension.

By the foregoing configuration, it is possible with a simple structure to transmit to the pillar a load that is applied to the impact beam.

BRIEF DESCRIPTIONS OF THE DRAWINGS

The foregoing and further objects, features, and advantages of the invention will become apparent from the following description of preferred embodiments with reference to the accompanying drawings, wherein like numerals are used to represent like elements and wherein:

FIG. 13 is a partial cross-sectional view showing a door and a body pillar to which the vehicle body side structure according to the seventh embodiment of the present invention is applied, with the door in the closed condition;

DETAILED DESCRIPTION OF THE PREFERRED EMBODIMENTS

Figure 1:
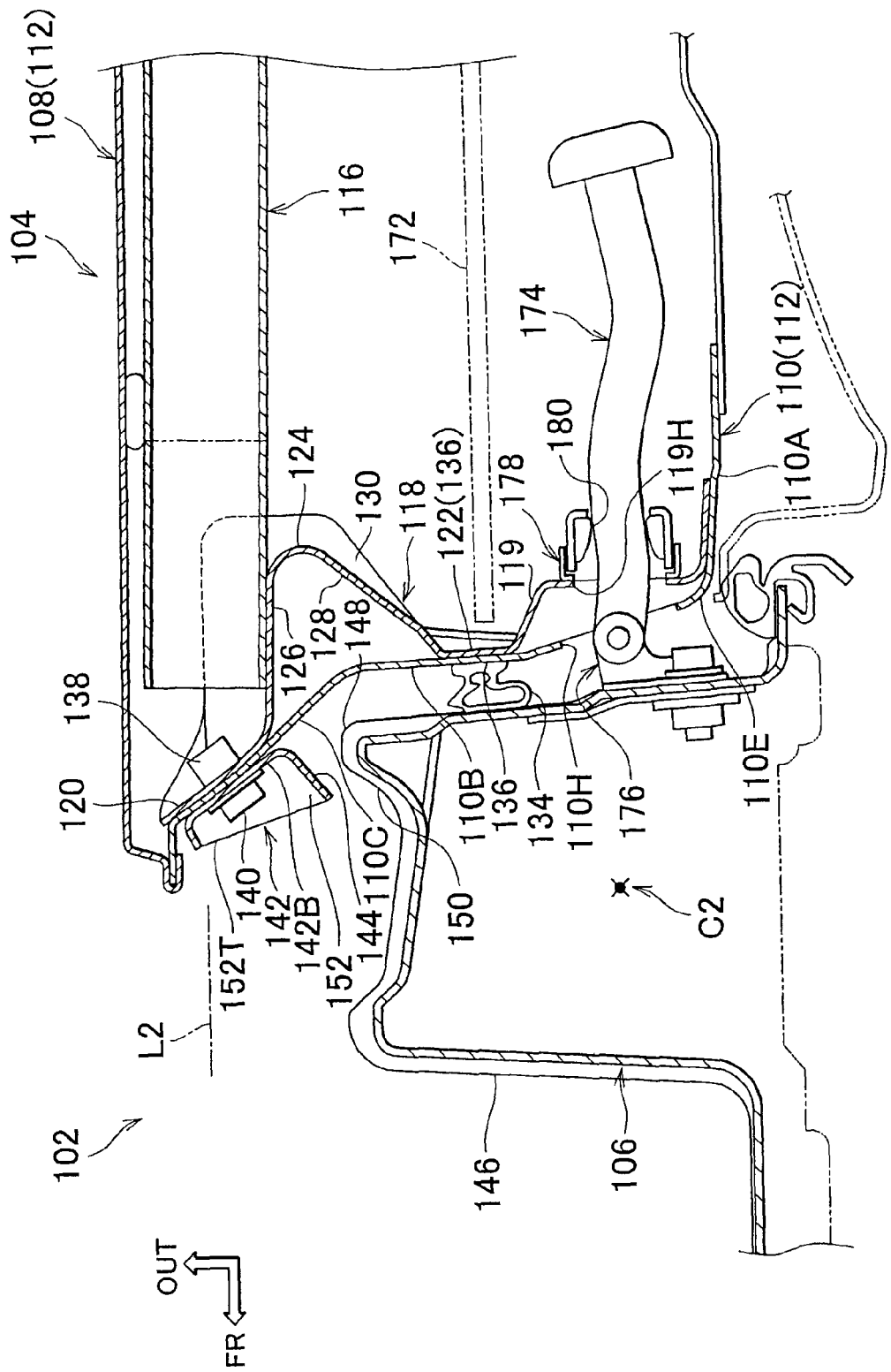
FIG. 1 is partial cross-sectional view showing a door and a body pillar to which the vehicle body side structure according to a first embodiment of the present invention is applied, with the door in the closed condition.
Figure 2:
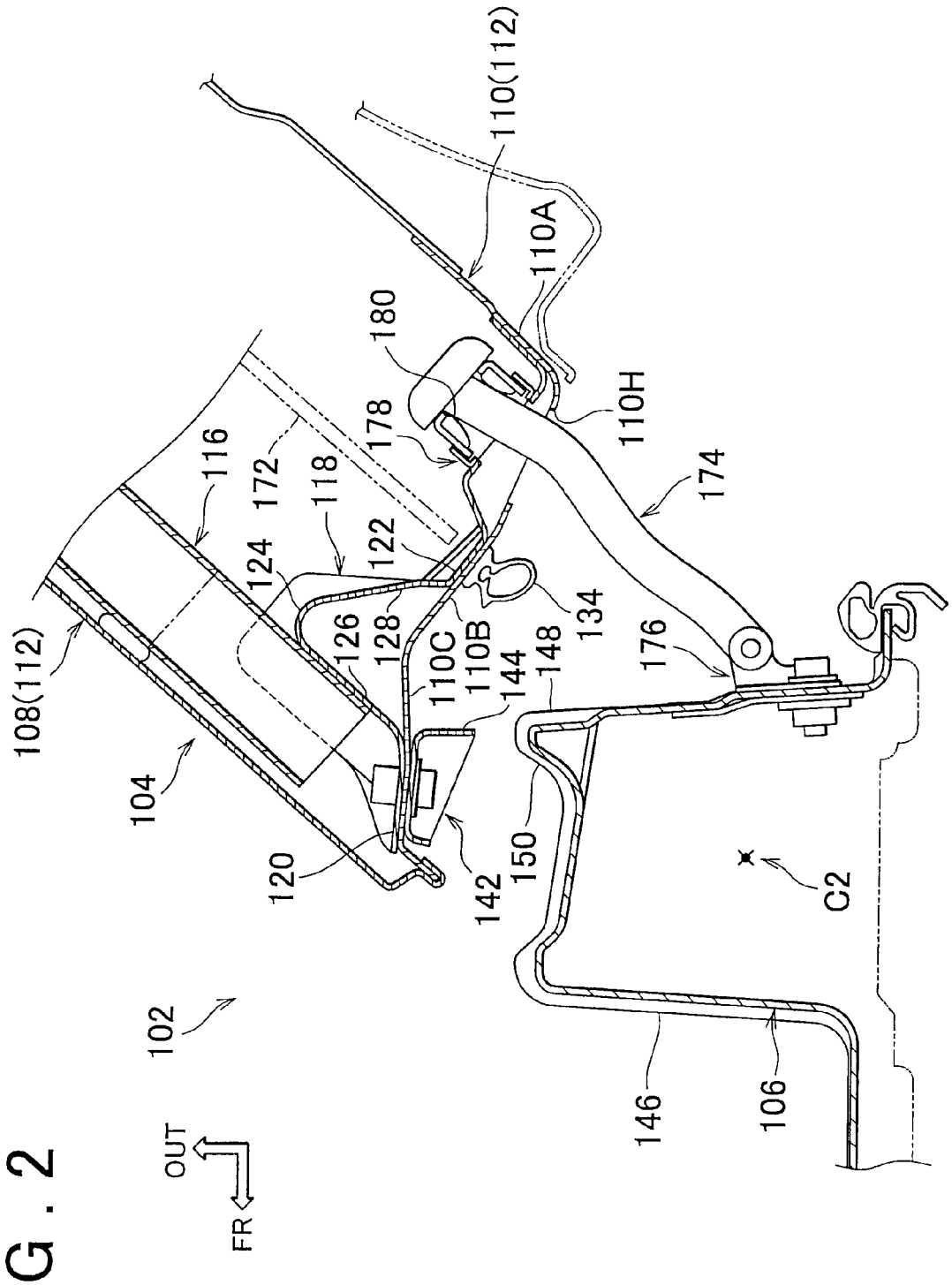
FIG. 2 is partial cross-sectional view showing a door and a body pillar to which the vehicle body side structure according to the first embodiment of the present invention is applied, with the door in the open condition.

FIG. 1 shows a partial view of a vehicle body side structure 102 according to the first embodiment of the present invention. The vehicle body side structure 102 of this embodiment is applied to a supporting end side of a door 104 supported at one end swingably with respect to the vehicle body, and a body pillar 106 forming a part of the vehicle body at this support end side. FIG. 2 shows the vehicle body side structure 102 in the condition in which the door 104 is swung open. In the following, the forward direction of the vehicle is indicated by the arrow FR, the upward direction by the arrow UP, and the outside in the vehicle widthwise direction by the arrow OUT.

As can be understood from FIG. 1 and FIG. 2, the door 104 has a door inner panel 110 and a door outer panel 108. The door outer panel 108 has a substantially flat plate shape, and the door inner panel 110 is formed by a flat-plate part 110A positioned inside the door outer panel 108 in the vehicle widthwise direction and substantially parallel to the door outer panel 108, a front wall part 110B extending from the flat plate part 110A toward the front end part of the door outer panel 108, and an outwardly extended part 110C extending outwardly from the front wall part 110B forward at an inclination. The outwardly extended part 110C, when seen from the vehicle widthwise direction, partially overlaps with the door pillar 106. The door outer panel 108 and the door inner panel 110 are in mutual contact at the outer periphery part, and form the door body 112.

Figure 3:
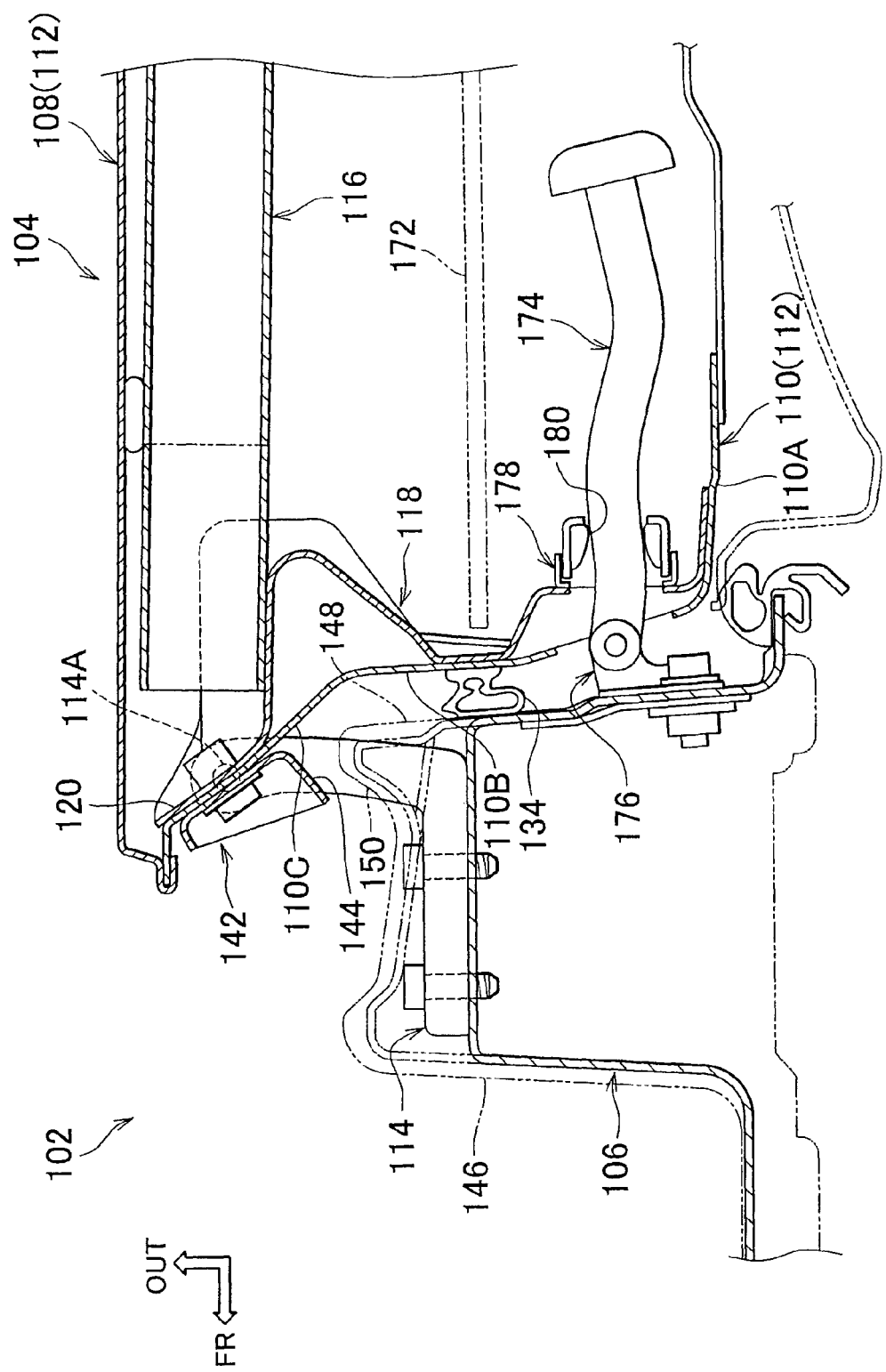
FIG. 3 is a partial cross-sectional view showing a different cross-section of a door and a body to which the vehicle body side structure according to the first embodiment of the present invention is applied, with the door in the closed condition.

As shown in FIG. 3, a door hinge 114 is provided between the outwardly extended part 110C and the body pillar 106. The door hinge 114 enables the door 104 to swing about the swinging center axis 114A An impact beam 116 is disposed between the door outer panel 108 and the door inner panel 110. In this embodiment, the impact beam 116 is formed in a tubular or bar shape, is made of a material having a prescribed strength (rigidity), and is disposed so that the axis direction thereof substantially coincides with the longitudinal (front-back) direction of the vehicle (and minimally has a component in the vehicle longitudinal direction).

Figure 4:
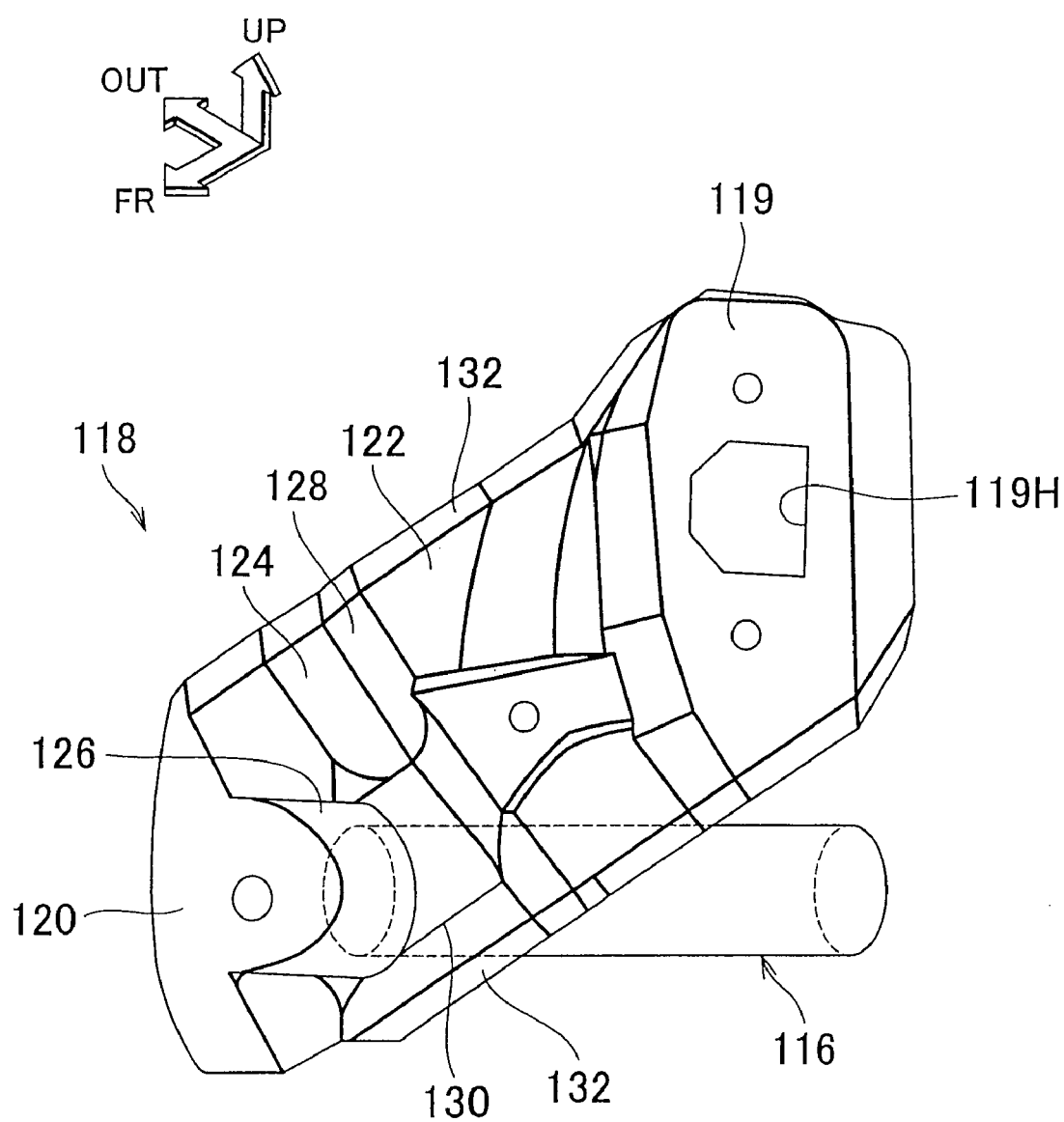
FIG. 4 is a perspective view showing in expanded form the impact beam extension part of a vehicle body side structure according to the first embodiment of the present invention.
Figure 5:
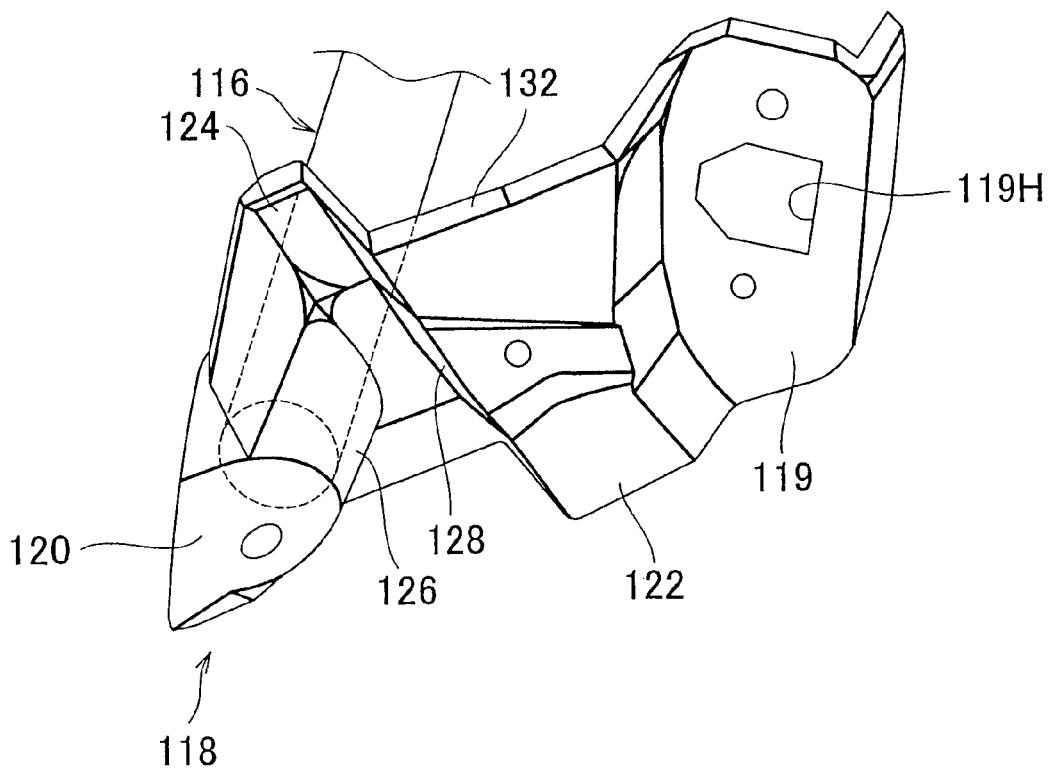
FIG. 5 is a perspective view showing in expanded form the impact beam extension part of a vehicle body side structure according to the first embodiment of the present invention.

As shown in FIG. 1 and FIG. 2, the front end part of the impact beam 116 is mounted to the door inner panel 110 by means of the impact beam extension 118, which is shown in detail in FIG. 4 and FIG. 5. The impact beam extension 118 has joining parts 120, 122 at the outer end part and inner end part, respectively in the vehicle widthwise direction, joined to the door inner panel 110, the outwardly extending part 110C and the front wall part 110B. Additionally, an outwardly expanded part 124 is formed between the joining parts 120, 122 so as to expand outwardly in the vehicle widthwise direction away from the door inner panel 110 at an inclination to the vehicle widthwise direction. In this embodiment, the outwardly expanding part 124 has a substantially triangular shape, when viewed from above and has formed in the part that is substantially parallel to the door outer panel 108 and an impact beam fixing part 126. The impact beam fixing part 126 has the front-end part of the impact beam 116 fixed to it.

The part that extends from the impact beam fixing part 126 at an inclination to the door inner panel 110 is the load transmission part 128 by which a load from the impact beam 116 is transmitted to the door inner panel 110. The load transmission part 128 is formed in a direction from the impact beam fixing part 126 toward the body pillar 106, and the shape thereof is established so that, when the door is closed, the extension line thereof extends at an angle facing the centroid C2 of the body pillar 106.

As shown in detail in FIG. 4 and FIG. 5, a reinforcing bead 130 extending from the impact beam fixing part 126 to the load transmission part 128 is formed on the impact beam extension 118. At a position substantially central in the up/down direction of the impact beam extension 118, the impact beam fixing part 126 has a shape that wraps around the outer periphery of the impact beam 116 (substantially semi-circular in shape in this embodiment), and the load transmission part 128 is formed so as to be convex in the vehicle widthwise direction. Therefore, at the part at which the reinforcing bead 130 is formed, the impact beam extension 118 has a so-called hat-shaped cross-section. The reinforcing bead 130 reinforces the impact beam extension 118, and particularly reinforces the load transmission part 128. In the same manner, at a location on the impact beam extension 118 that extends from the impact beam fixing part 126 toward the load transmission part 128, a reinforcing flange 132 is formed at the top and bottom edges of the impact beam extension 118. At the parts at which the reinforcing flanges 132 are formed, the impact beam extension 118 has a U-shaped cross-section.

The reinforcing flanges, similar to the reinforcing bead 130, reinforce the impact beam extension 118, and particular reinforce the load transmission part 128.

As shown in FIG. 1, the joining part 122 of the impact beam extension 118 sandwiches the door inner panel 110 with the door weather strip mounting part 136 of the door weather strip 134, described later, and is joined to the door inner panel 110 on the opposite side of the door weather strip mounting part 136. The impact beam extension 118 joining part 122, therefore, also acts as a mounting part for the door weather strip 134.

The impact beam extension 118 is integrally formed with the reinforcing bead 130 and reinforcing flange 132, at least from the impact beam fixing part 126 up until the load transmission part 128.

Also, as shown in FIG. 1 and FIG. 2, the joining part 120 of the impact beam extension 118 is mounted to the outwardly extended part 110C of the door inner panel 110 by a bolt 138 and a nut 140. The bolt 138 and the nut 140 also mount the mating bracket 142 to the outside of the door inner panel 110. That is, the joining is done so that the door inner panel 110 is sandwiched between the mating bracket 142 and the impact beam extension 118.

As shown in FIG. 1, the mating bracket 142 is formed so as to have a flat inclined tubular shape, and is mounted to the door inner panel 110 by the bolt 138 and the nut 140 at the bottom surface 142B at one end thereof in the axial direction. The surface on the opposite side from the bottom surface is open.

The surface of the mating bracket 142 that is at a position on the inside in the vehicle widthwise direction as seen from above, is an inclined surface 144 that is inclined at an acute angle with respect to the forward extension line L2 from the impact beam 116.

Figure 6:
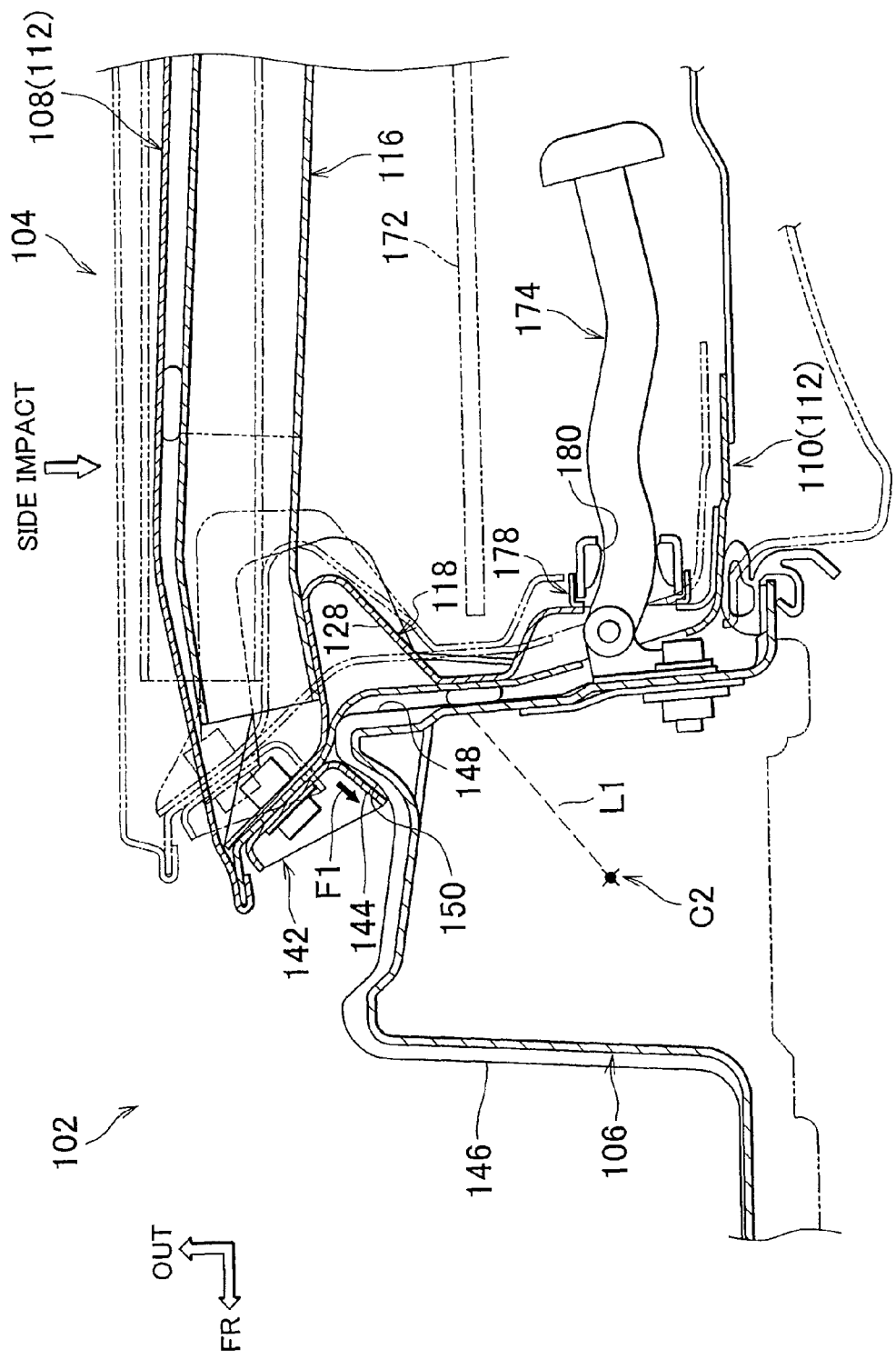
FIG. 6 is a cross-sectional view showing a cross-section, similar to FIG. 1, of a door to which the vehicle body side structure according to the first embodiment of the present invention is applied, with the door at the time of a side impact.

As shown in FIG. 1 and FIG. 2, a side member 146 is provided on the body pillar 106, so as to surround the periphery of the body pillar 106 when viewed from above. This side member 146 has a protruding mating piece 148 that faces outwardly in the vehicle widthwise direction. The surface of the mating piece 148 in the forward direction of the vehicle is the opposing surface 150 opposite the inclined surface 144 of the mating bracket 142. As shown in FIG. 6, because the inclined surface 144 is caused to be inclined at an acute angle with respect to the forward extension line L2 from the impact beam 116, when the inclined surface 144 moves toward the inside in the vehicle widthwise direction from the condition in which it is in contact with the opposing surface 150, a force acts on the inclined surface 144 from the opposing surface in the direction of the arrow F1.

In this embodiment of the present invention in particular, the direction of inclination of the load transmission part 128 of the impact beam extension 118 coincides with the direction of inclination of the inclined surface 144 of the mating bracket 142. Therefore, when the inclined surface 144 contacts with the opposing surface 150 and receives a force in the direction of the arrow F1, a similar force acts from the impact beam 116 on the impact beam extension 118, in a direction that is the same as the extension direction of the load transmission part 128.

The door weather strip 134 is mounted to the door inner panel 110 at a position further to the inside of the mating bracket 142 in the vehicle widthwise direction. The door weather strip 134 is disposed so as to surround the outer periphery of the door body 112, and comes into intimate contact with the vehicle body (body pillar 106 and the like) when the door 104 is in the closed condition, so that unwanted water and dust do not enter the passenger compartment. In particular in this embodiment, as noted above, the joining part 122 of the impact beam extension 118 also acts as the door weather strip mounting part 136 for the door weather strip 134. Therefore, the door weather strip 134 is disposed at a position opposite the joining part 122, and the joining part 122 and the door weather strip 134 are joined so as to sandwich the door inner panel 110 between the joining part 122 and the door weather strip 134.

A shown in FIG. 1, a door check 174 is disposed at a position that is further inside in the vehicle widthwise direction than the door weather strip 134. The front end of the door check 174 is swingably supported by the support member 176 mounting to the body pillar 106. The rear end of the door check 174 is held by a sliding member (not illustrated) so that it slides with respect to the door 104 when the door 104 swings. The part of the door check 174 from the front end to the center part is inserted through an aperture 110H formed in the door inner panel 110.

A door check bracket 178 is disposed inside the door 104. A sliding part 180 against which the door check 174 slides is formed on the door check bracket 178, and by the door check 174 sliding against the sliding part 180 when the door is opened or closed, the prescribed resistance is imparted. Also, A joining part 119, to which the door check bracket 178 is joined, is formed on the impact beam extension 118 at a position in the inside in the vehicle widthwise direction. An insertion hole 119H through which the door check 174 is inserted is also formed in the joining part 119.

As can be understood from FIG. 1 and FIG. 2 (and as shown in detail in FIG. 4 and FIG. 5), in this embodiment, a door check bracket 178 is formed so as to cross over the joining part 122 of the impact beam extension 118, the impact beam extension 118 and the door check bracket 178 being formed integrally.

The operating effect of this embodiment is described below.

Consider the condition, as shown in FIG. 6, when a load is applied to the door 104 from side (this condition being referred to as "at the time of a side impact"). The load is transmitted from the impact beam 116 to the body pillar 106 via the impact beam extension 118 and the door inner panel 110. In this embodiment, the load transmission part 128 that extends at an inclination from the impact beam fixing part 126 toward the door inner panel 110 is formed from the impact beam fixing part 126 toward the body pillar 106. In particular, the transmission part 128 is formed so that the transmission extension line L1 is extended toward the centroid C2 of the body pillar 106. It is therefore possible for the load from the impact beam 116 to be transmitted in a straight line to the centroid C2 of the body pillar 106 while suppressing the twisting moment of the body pillar 106.

When this occurs, because the inclined surface 144 of the mating bracket 142 is pressed against the opposing surface 150, the inclined surface 144 moves toward the inside in the vehicle widthwise direction and receives the force in the direction of arrow F1 while making contact with the opposing surface 150. In this embodiment in particular, because the load transmission part 128 of the impact beam extension 118 and the inclined surface 144 of the mating bracket 142 are parallel, a load from the impact beam 116 with respect to the impact beam extension 118 acts in the direction of extension of the load transmission part 128 and the load is transmitted to the body pillar 106 with good efficiency.

Furthermore, because a reinforcing bead 130 and reinforcing flanges 132 (refer to FIG. 4 and FIG. 5) are provided on the impact beam extension 118, buckling of the impact beam extension 118 when a load from the impact beam 116 is transmitted to the body pillar 106 is prevented, and it is possible to transmit the load to the body pillar 106 with good efficiency. In particular, the impact beam extension 118 forms a hat-shaped cross-section with the reinforcing bead 130, and forms a U-shape cross-section with the reinforcing flanges 132. Because the impact beam extension 118 itself has a high strength in this manner, it is possible to transmit a load to the body pillar 106 from the impact beam extension 118 as well.

Additionally, in this embodiment, the joining part between the impact beam 116 and the impact beam extension 118 (vicinity of the impact beam fixing part 126) and the joining part between the impact beam extension 118 and the door inner panel 110 (the vicinity of the joining part 122) are covered by the reinforcing bead 130 or reinforcing flanges 130 when viewed from above. As a result, it is possible to achieve waterproofing and rust-preventing effects with respect to these joining parts.

Although it is not necessary to provide both the reinforcing bead 130 and the reinforcing flanges 132 on the impact beam extension 118, it being possible to provided only one of the two. However, by providing both it is possible to reliably achieve the above-described effect. In particular, in cases such as when the impact beam 116 is a circular pillar shape, it is possible with the reinforcing bead 130 to distribute a load from the impact beam 116 to the load transmission part 128 from a concentration point to a surface. In the case of the reinforcing flanges 132 as well, it is possible to distribute this load.

In this embodiment, the impact beam extension 118 are integrally formed from the impact beam fixing part 126 of the impact beam extension 118 up until the load transmission part 128. If the impact beam fixing part 126 and load transmission part 128 are configured as separate items, a member for the joining of these elements is required. In this embodiment, however, the joining member is not required. Furthermore, if the elements are separately formed, edge parts occur at the joining surfaces therebetween. In this embodiment, however, because there are no such edges, there is an improvement in waterproofing and rust prevention. Additionally, because the reinforcing bead 130 and reinforcing flanges 132 are formed integrally with the impact beam fixing part 126 and the load transmission part 128, it is easy to maintain the shape when forming the impact beam extension 118 (generally when forming by pressing), and the forming accuracy is improved. Of course, because the impact beam extension 118 is formed in one piece to be continuous from the impact beam fixing part 126 up until the load transmission part 128, it is possible to transmit a load from the impact beam 116 to the centroid C2 of the body pillar 106 will good efficiency.

In particular, the largest load in the impact beam extension 118 from the impact beam 116 acts on the reinforcing bead 130 at the time of a side impact. By forming the reinforcing bead 130 to match the outer shape of the impact beam 116 (substantially a semicircular tube in this embodiment) and forming the reinforcing bead 130 continuously from the impact beam fixing part 126 up until the load transmission part 128, the load from the impact beam 116 is distributed over a wide range (preferably all) of the impact beam extension 118 and it is possible to transmit the load to the body pillar 106 with good efficiency.

Figure 7:
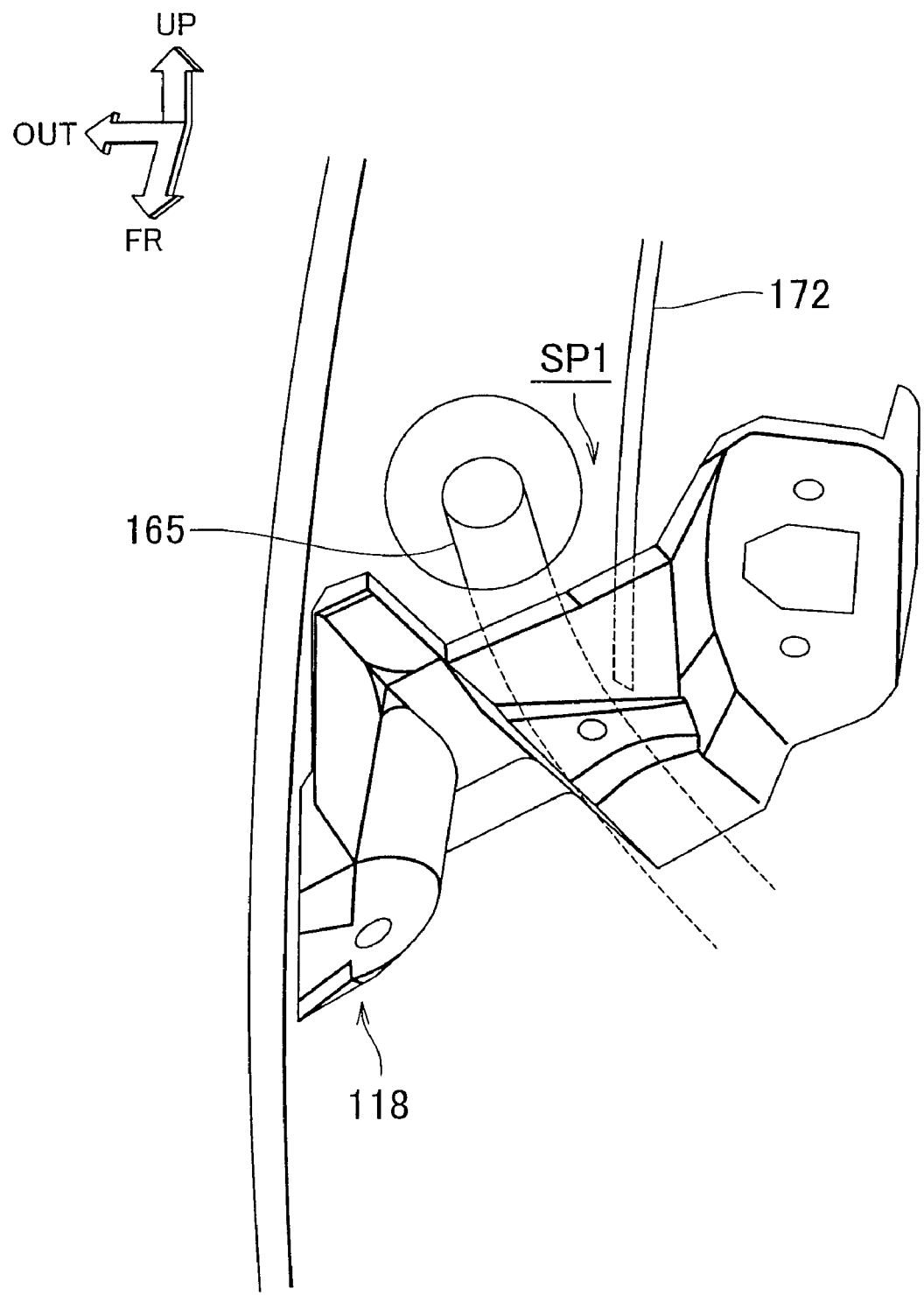
FIG. 7 is a perspective view showing in expanded form the impact beam extension and the vicinity thereof as part of the vehicle body side structure according to the first embodiment of the present invention.

Additionally, in this embodiment, by forming the impact beam extension 118 so as to have the above-noted shape, the joining part 122 to the door inner panel 110 moves in the direction toward the center in the vehicle widthwise direction from the inside angle part 110E of the door inner panel 110 (refer to FIG. 1), thereby reducing the size as an impact beam extension 118 (particularly in the vehicle widthwise direction). Therefore, the weight of the impact beam extension 118 itself is reduced, and also, as shown in FIG. 7, it is possible to secure a mounting space SP1 within the door such as a space for providing a window glass elevator and a space for providing a wire harness 165. By doing this, it is possible to reduce the length and weight of the door 104. Also, because it is possible to establish a large width for the window glass 172 (length in the vehicle longitudinal direction), it is possible to form a large door window frame, thereby improving the ease, for example, of passing objects through the window.

In this embodiment, a joining part 122 of the impact beam extension 118 is provided at the part at which the door weather strip 134 is mounted, that is, the part at which the structural space between the body pillar 106 and the door 104 in the vehicle longitudinal direction becomes narrow. Therefore, if a shock is received in the vehicle longitudinal direction it is possible to transmit the load from the body pillar 106 to the impact beam 116 via the impact beam extension 118, thereby improving the bending strength of the body pillar 106.

Figure 8:
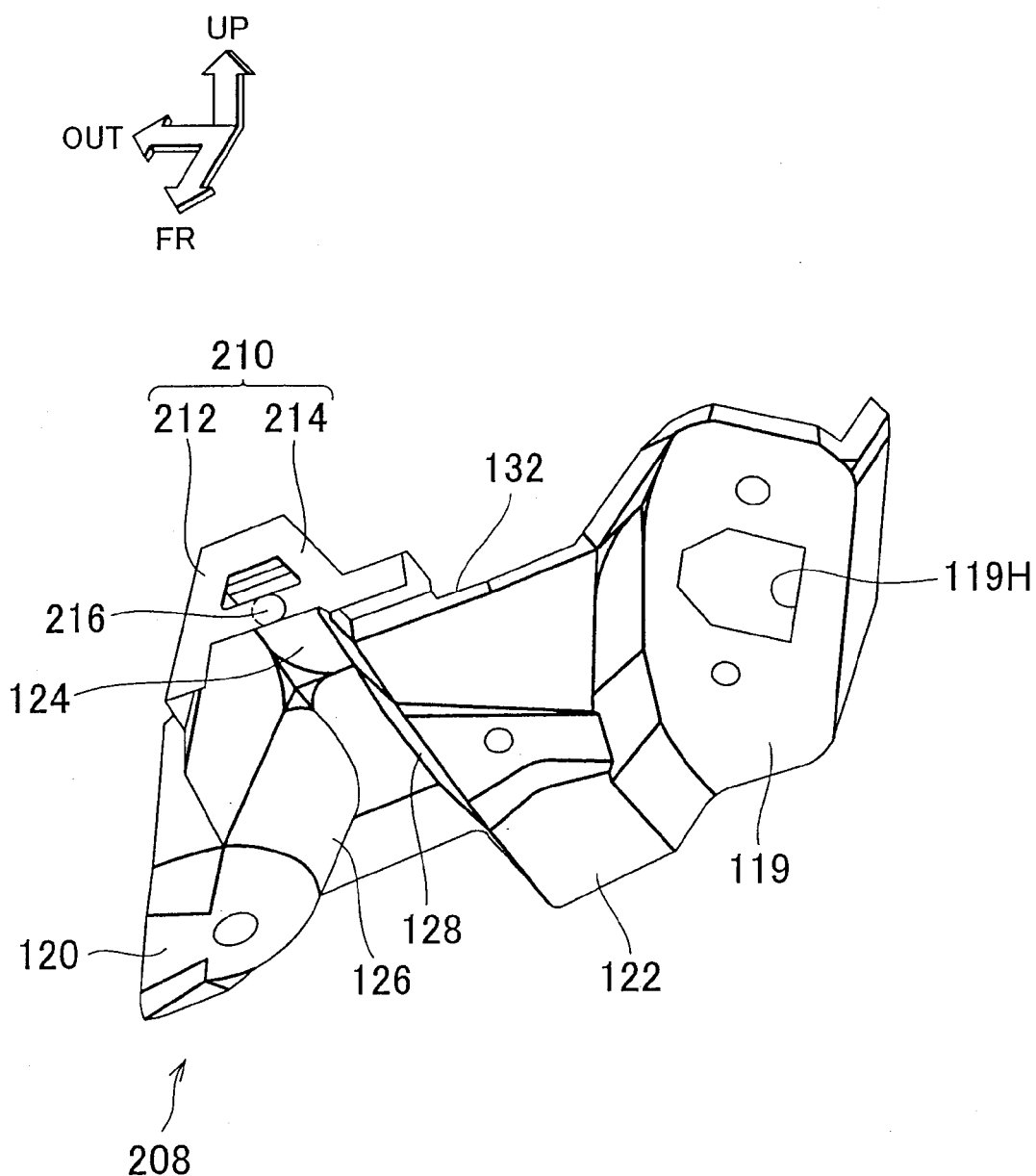
FIG. 8 is a perspective view showing in expanded form the impact beam extension according to a second embodiment of the present invention.

FIG. 8 shows an impact beam extension 208 according to the second embodiment of the present invention. In the second embodiment, because only the shape of the impact beam extension differs from the first embodiment, and all other elements are the same, only the difference is described below.

In the impact beam extension 208 of the second embodiment, small reinforcing flange pieces 212, 214 that act in the same way of the reinforcing flange 132 of the first embodiment are formed at different locations on the upper edge or lower edge thereof. The small reinforcing flange pieces 212, 214 are joined by a partially overlapping joining part 216, and as a whole form a reinforcing flange 210. Because the impact beam extension 208 of this embodiment, compared with the impact beam extension 118 of the first embodiment, has a stronger reinforcing flange 210, it is possible to transmit a load from the impact beam 116 to the body pillar 106 with greater reliability.

If an impact is received from the side, the joining part 120 (refer to FIG. 1) is moved inward in the vehicle widthwise direction by the impact, the mating bracket 142 comes into contact with the door inner panel 110, and the door inner panel 110 comes into contact with the body pillar 106. That is, transmission of the impact to the body pillar 106 is possible via the joining part 120.

Figure 9:
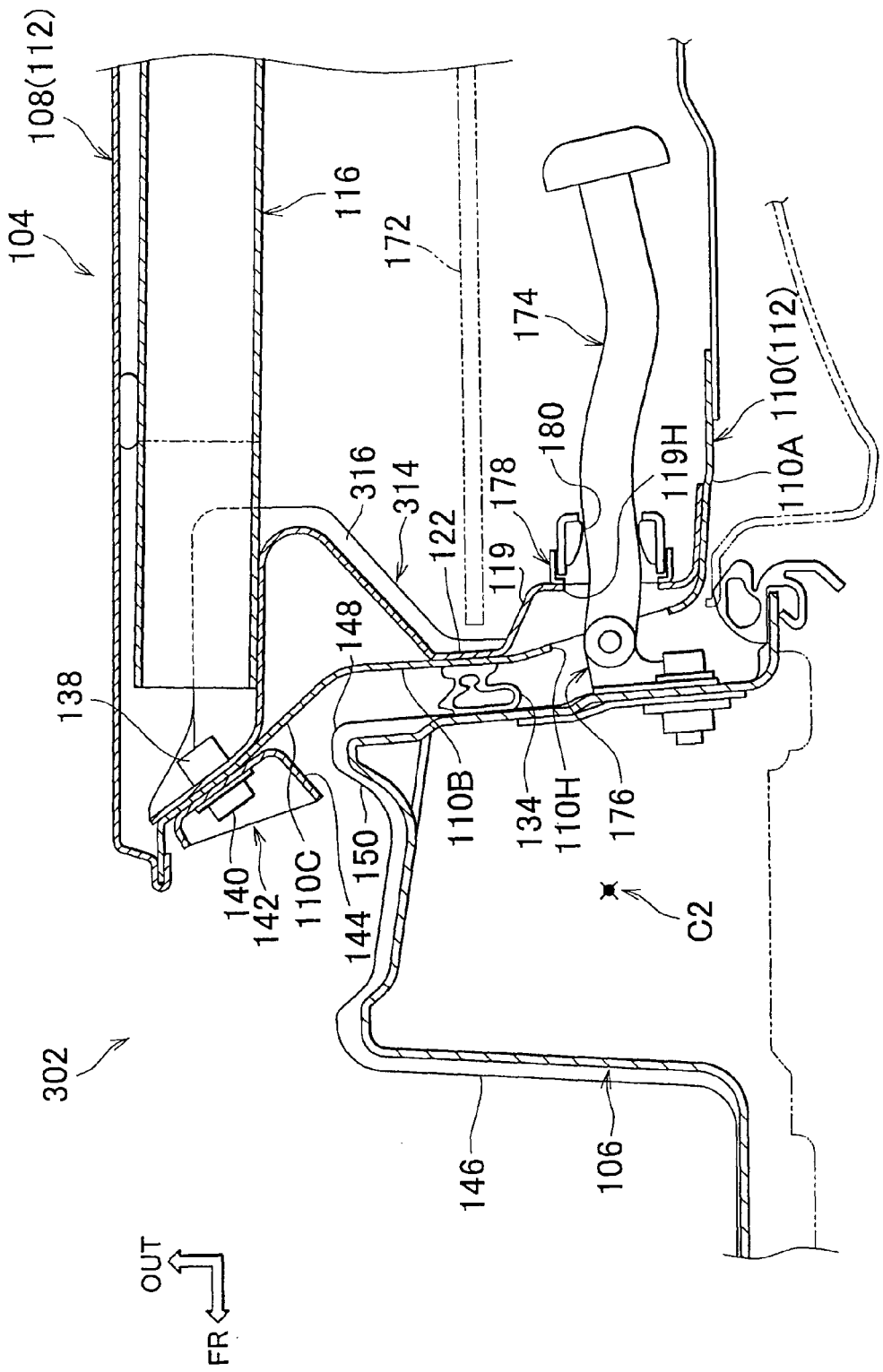
FIG. 9 is a partial cross-sectional view showing a door and a body pillar to which the vehicle body side structure according to the third embodiment of the present invention is applied, with the door in the closed condition.

FIG. 9 shows a vehicle body side structure 302 according to the third embodiment of the present invention. In the third embodiment, because only the shape of the bead structure of the impact beam extension differs from the first embodiment, and all other elements are the same, corresponding constituent elements are assigned the same reference numerals and are not described in detail herein.

Although the reinforcing bead 316 of the impact beam extension 314 of the third embodiment, compared with the reinforcing bead 130 of the impact beam extension 118 shown in FIG. 4, is similar to the first embodiment in that it extends from the impact beam fixing part 126 to the load transmission part 128, it differs in that the reinforcing bead 316 is extended up to the joining part 122.

In this manner, by providing a reinforcing bead 316 that extends up to the joining part 122, it is possible at the time of a side impact to reliably transmit the load from the impact beam 116 to the body pillar 106, via the impact beam extension 314 and the door inner panel 110.

Figure 10:
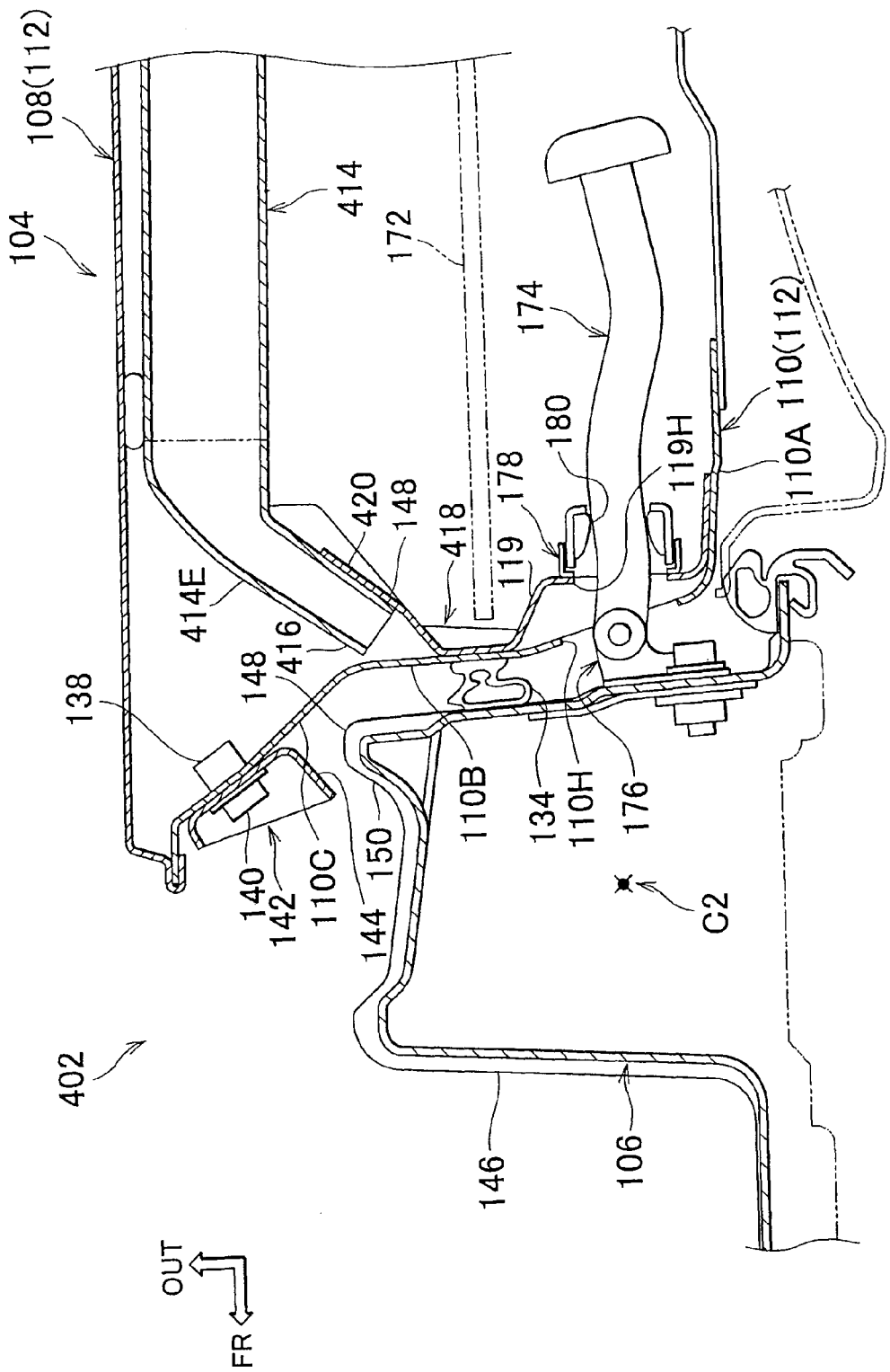
FIG. 10 is a partial cross-sectional view showing a door and a body pillar to which the vehicle body side structure according to the fourth embodiment of the present invention is applied, with the door in the closed condition.

FIG. 10 shows a vehicle body side structure 402 according to the fourth embodiment of the present invention. In the fourth embodiment as well, elements that are the same as in the first embodiment are assigned the same reference numerals and are not described in detail herein.

In the impact beam 414 of the fourth embodiment, the end part 414E is bent toward the inside in the vehicle widthwise direction, and the end of this bent part forms the fixed part 416. Also, the impact beam extension 418 of the fourth embodiment has an impact beam fixing part 420 having a shape that extends at an inclination opposite the fixed part 416, whereas it does not have the joining part 120 of the first embodiment. Therefore, a part of the load transmission part 128 essentially overlaps with the impact beam fixing part 420.

In the fourth embodiment configured in this manner, because the fixed part 416 of the impact beam 414 is disposed along the load transmission part 128, the load transmission part 128 is reinforced. Also, by eliminating the joining part 120, it is possible to reduce the size and the weight of the impact beam extension 418.

Figure 11:
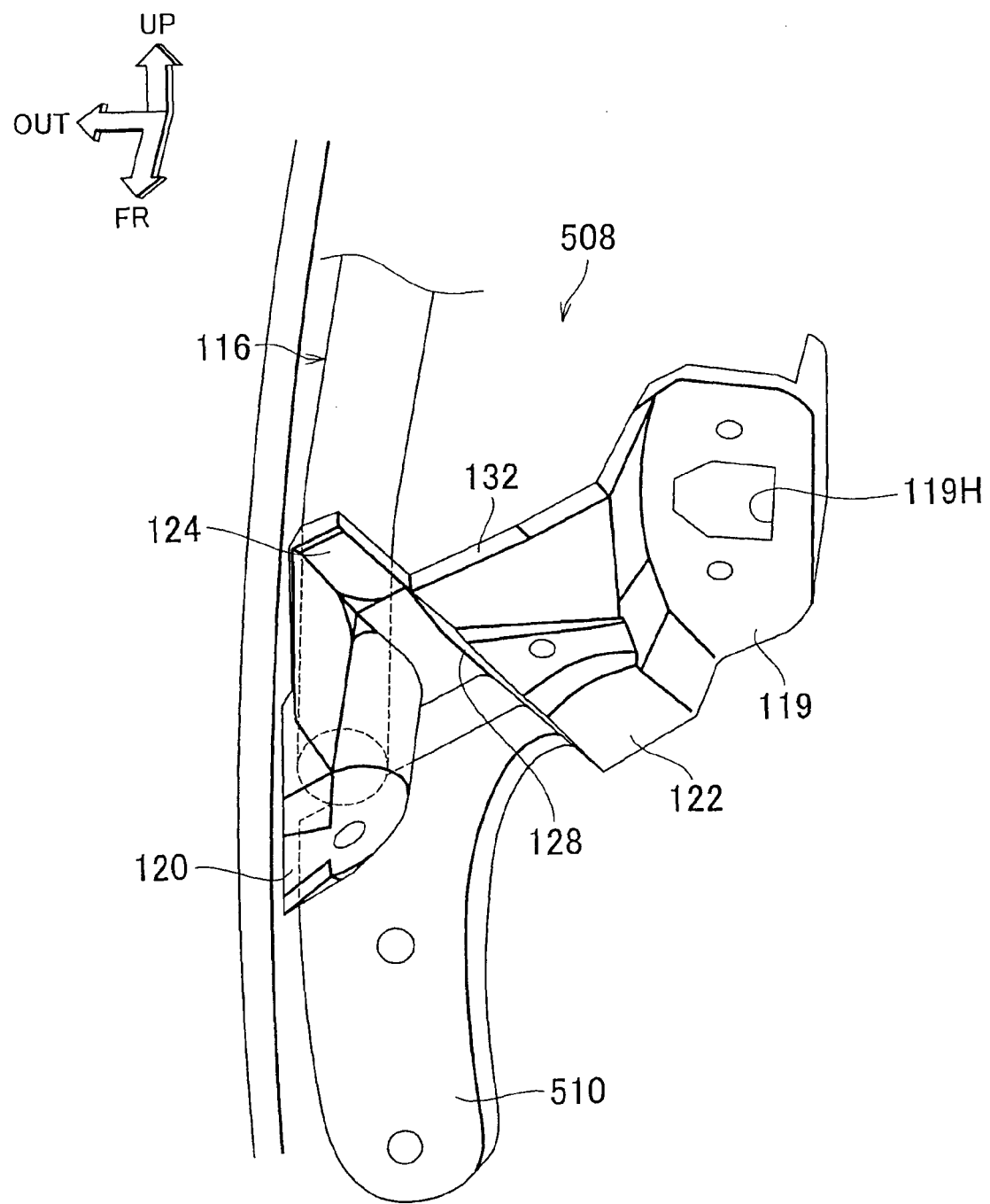
FIG. 11 is a perspective view showing in expanded form the impact beam extension and the vicinity thereof part of the vehicle body side structure according to the fifth embodiment of the present invention.

FIG. 11 shows an impact beam extension 508 of the fifth embodiment of the present invention. In the fifth embodiment, because only the shape of the impact beam extension 508 differs from the first embodiment, and all other elements are the same, only the difference is described below.

The impact beam extension 508 of the fifth embodiment further includes the lower hinge retainer 510 and they are integrally formed. With the lower hinge retainer 510, a load at the time of a side impact is transmitted not only to the impact beam extension 508, but also the hinge retainer 510 and further to the hinge, resulting in distribution of the load.

Figure 12:
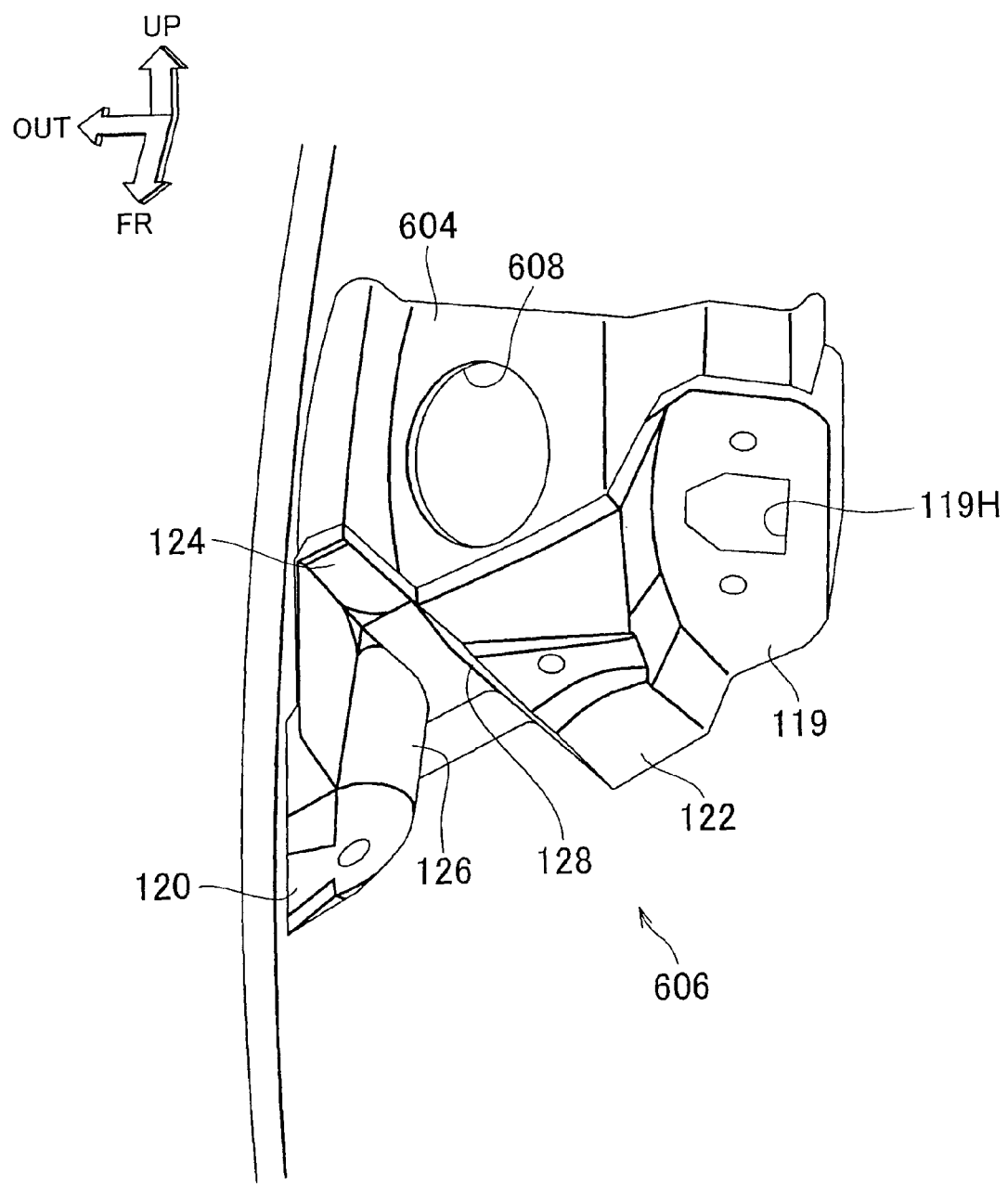
FIG. 12 is a perspective view showing in expanded form the impact beam extension and the vicinity thereof part of the vehicle body side structure according to the sixth embodiment of the present invention.

FIG. 12 shows an impact beam extension 606 of the sixth embodiment of the present invention. In the sixth embodiment, because only the shape of the impact beam extension 606 differs from the first embodiment, and all other elements are the same, only the difference is described below.

In the sixth embodiment, a wire-harness mounting member 604, in which a wire passage hole 608 is formed for passing a wire harness is formed integrally with the impact beam extension 606 on the door inner panel 110 (refer to FIG. 1). By doing this, it is possible to receive the load from the impact beam 116 by not only the impact beam extension 606 but also the wire-harness mounting member 604, thereby increasing the force-receiving surface area.

FIG. 13 shows a vehicle body side structure 702 according to the seventh embodiment of the present invention. In the seventh embodiment as well, elements that are the same as in the first embodiment are assigned the same reference numerals and are not described in detail herein.

Figure 14A:
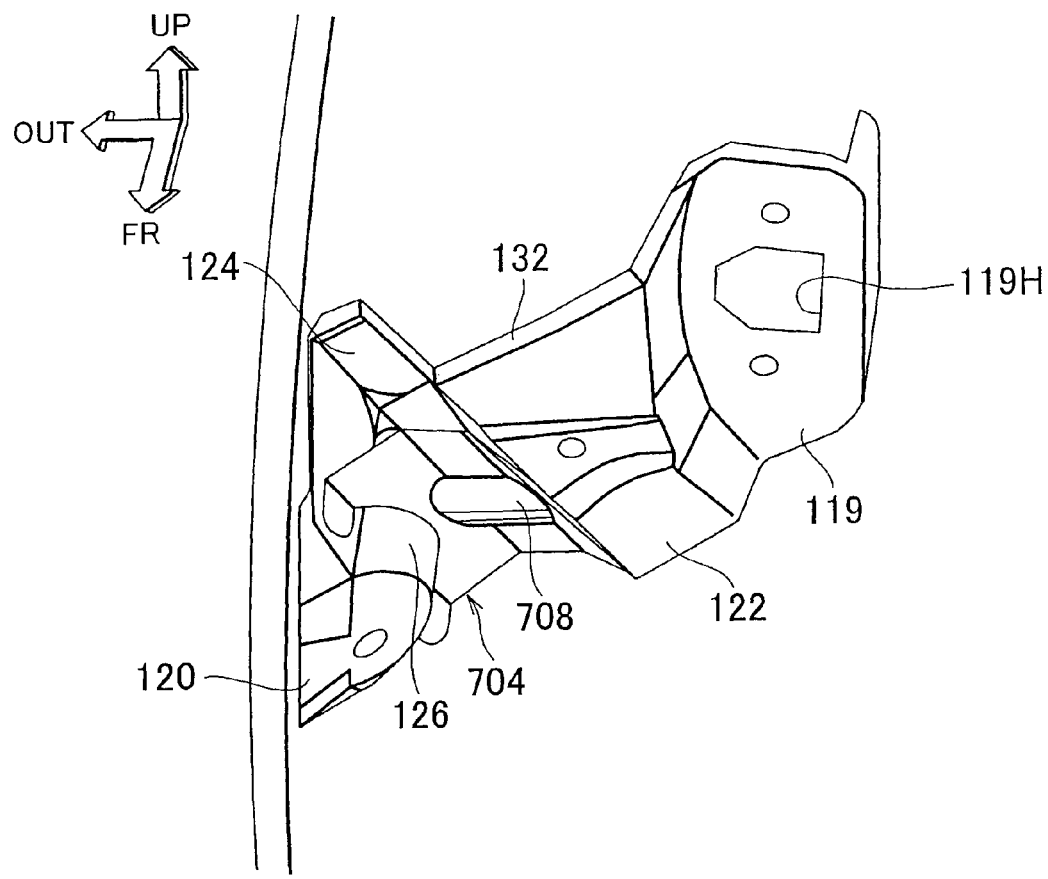
FIG. 14A is a perspective view showing in expanded form the impact beam extension and the vicinity thereof according to the seventh embodiment of the present invention.
Figure 14B:
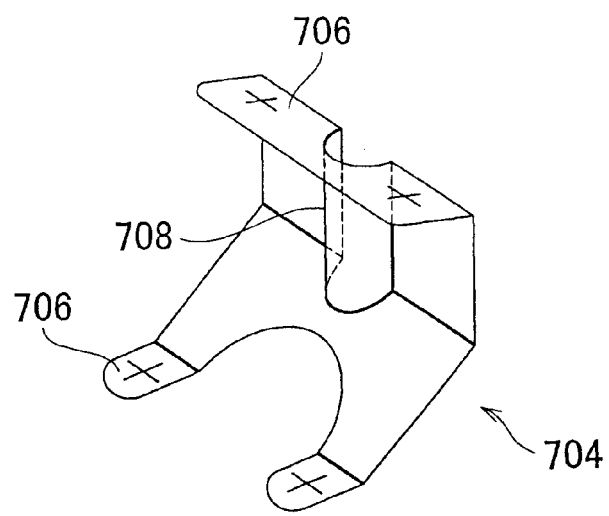
FIG. 14B is a perspective view showing in expanded form the reinforcing bracket according to the sixth embodiment of the present invention.

In the seventh embodiment, as shown in FIG. 14A and FIG. 14B, a reinforcing bracket 704 is mounted to one and the same impact beam extension 118 as in the first embodiment. The reinforcing bracket 704 is formed so as to pass over between the impact beam fixing part 126 of the impact beam extension 118 and the joining part 122. Joining pieces 706 at both ends of the reinforcing bracket 704 are joined to the impact beam extension 118 by welding or the like. Because the reinforcing bracket 704 reinforces the impact beam extension 118, if a load is applied at the time of a side impact, deformation of the impact beam extension 118 is prevented, and the load is reliably transmitted to the body pillar 106. Also, as shown in FIG. 14B, a reinforcing rib 708 may be formed on the reinforcing bracket 704, so as to increase the strength of the reinforcing bracket 704 itself.

Figure 15B:
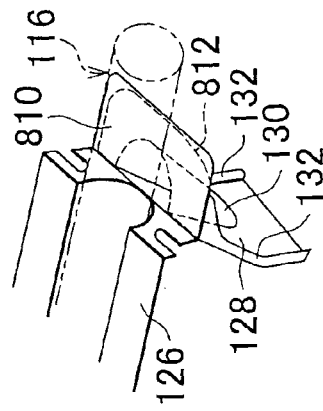
FIG. 15B is a perspective view showing in expanded form the impact beam extension according to an eight embodiment of the present invention.
Figure 15A:
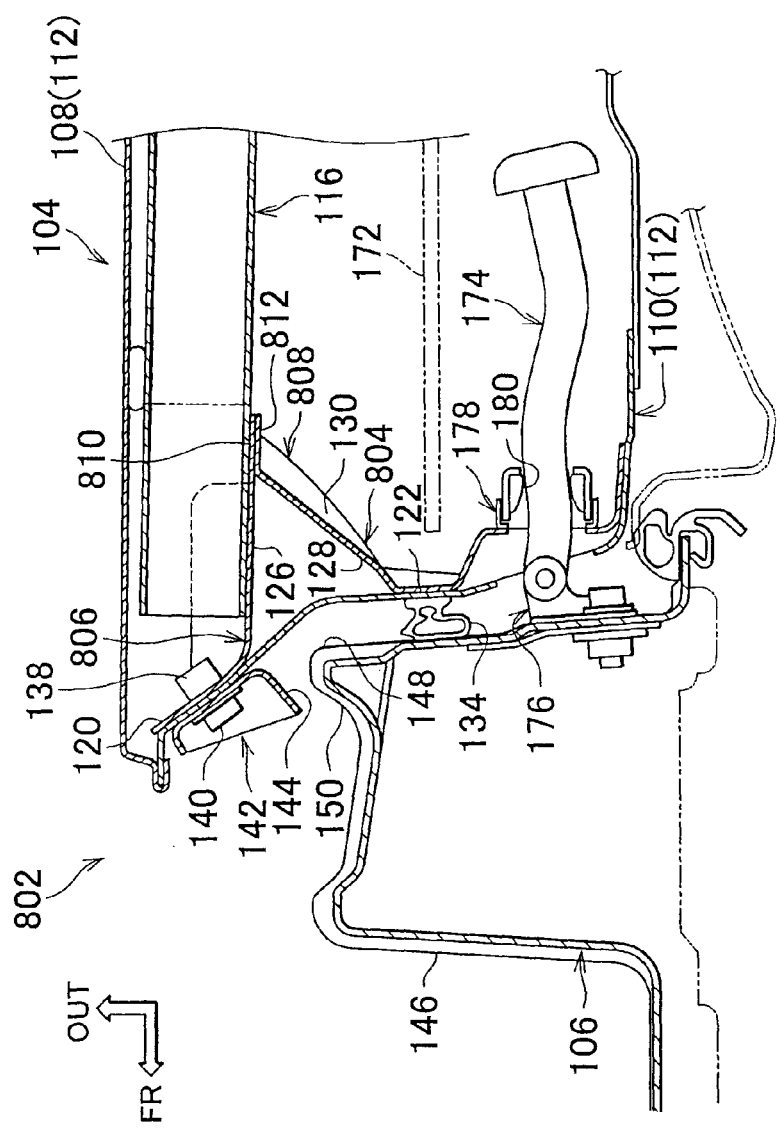
FIG. 15A is a partial cross-sectional view showing the door and body pillar to which a vehicle body side structure according to an eight embodiment of the present invention is applied, with the door in the closed condition.

FIG. 15A shows a vehicle body side structure 802 according to the eighth embodiment of the present invention. In the eighth embodiment as well, elements that are the same as in the first embodiment are assigned the same reference numerals and are not described in detail herein.

The impact beam extension 804 of the eighth embodiment, as shown in FIG. 15, is divided into an outer part 806 that is formed by a joining part 120 and an impact beam fixing part 126 and positioned outside in the vehicle widthwise direction, and an inner part 808, that is formed by the load transmission part 128 and the joining part 122 and positioned inside in the vehicle widthwise direction. The outer part 806 and the inner part 808 are mutually joined by the joining parts 810 and 812 (with part of the joining part 812 on the inside part overlapping with a part of the load transmission part 128), these collectively form an impact beam extension 804 having substantially the same shape as the impact beam extension 118 in the first embodiment. In this manner, the impact beam extension may be divided into a number of parts.

In the foregoing embodiments, although the mating bracket and the impact beam extension are described as being joined so as to sandwich the door inner panel 110, it is also possible to join additional other members to these elements. For example, part of a mirror bracket may be sandwiched by joining the mating bracket 142 and the impact beam extension.

In any of the described configurations, when a load is applied to the side of the door 104, it is possible to reduce the load imparted to the mirror bracket and the like by means of the mating bracket 142, and to efficiently transmit the load to the body pillar 106. Because these members reinforce the door inner panel 110 (and further by the mating bracket 142), it is possible to reduce the thickness and weight of the door inner panel 110.

In each of the described embodiments, because the mass of the third components, the impact beam, the impact beam extension, and the mating bracket are concentrated in the vicinity of the front edge of the door 104, it is possible to stabilize elastic deformation occurring as viewed front of the vehicle when the door 104 is closed, and possible to improve the tightness of closure of the door 104.

Additionally, if an embodiment of the present invention is applied to the lower edge or to the lower edge vicinity of the door 104, it is possible to support from below a window glass 172 having a large mass, and to achieve a weight balance. Also, the impact beam 116, the impact beam extension 118 and the mating bracket 142 are disposed in the direction corresponding to the door lock, thereby enabling a further improvement in the tightness of closure of door 104.

The joining of the impact beam extension and the mating bracket is not limited to joining with the bolt 138 and the nut 140, it being alternatively possible to apply welding, riveting, adhesives, or insertion or the like as a joining method.

While the invention has been described with reference to what are considered to be example embodiments thereof, it is to be understood that the invention is not limited to the disclosed embodiments or constructions. On the contrary, the invention is intended to cover various modification and equivalent arrangements. In addition, while the various elements of the disclosed invention are shown in various combinations and configurations, which are exemplary, other combinations and configurations, including more, fewer, or only a single element, are also within the spirit and scope of the invention.

The invention claimed is:

1. A vehicle body side structure comprising:
   a vehicle body door supported by a vehicle body;
   a pillar of the vehicle forming a part of the vehicle body at a supporting end side of the vehicle body door;
   an impact beam that extends in the longitudinal direction of the vehicle between an outer panel and an inner panel that form the vehicle body door; and an impact beam extension for mounting one end part of the impact beam to the inner panel, having an impact beam fixing part to which the impact beam is fixed and a load transmission part extending from the impact beam fixing part inwardly toward a centroid of the body pillar.

2. The vehicle body side structure of claim 1, wherein the impact beam extension includes joining parts joined to the inner panel, provided at an outer end part and an inner end part of the impact beam extension in the vehicle widthwise direction, and an outwardly expanded part, provided between the joining part provided at the outer end part and the joining part provided at the inner end part, expanded outwardly in the vehicle widthwise direction away from the inner panel.

3. The vehicle body side structure according to claim 2, wherein
the impact beam fixing part is provided at a location on the outwardly expanded part at the outside in the vehicle widthwise direction.

4. The vehicle body side structure according to claim 1, wherein
the load transmission part is formed in one piece with the impact beam fixing part.

5. The vehicle body side structure according to claim 1, wherein
a reinforcing member is provided in the impact beam extension at a part extending from the impact beam fixing part toward the load transmission part.

6. The vehicle body side structure according to claim 5, wherein
in the impact beam extension, the impact beam fixing part and the load transmission part are formed in one piece, including the reinforcing member.

7. The vehicle body side structure according to claim 5, wherein
the reinforcing member reinforces the load transmission part and is formed at an angle facing the centroid of the vehicle pillar from the impact beam fixing part.

8. The vehicle body side structure according to claim 1, further comprising:
a mating bracket sandwiching the inner panel with the impact beam extension, wherein
a surface located at the inside of the mating bracket in the vehicle widthwise direction is substantially parallel to an extension direction of the load transmission part of the impact beam extension.

9. A vehicle body side structure comprising:
a vehicle body door supported by a vehicle body;
a pillar of the vehicle forming a part of the vehicle body at a supporting end side of the vehicle body door;
an impact beam that extends in the longitudinal direction of the vehicle between an outer panel and an inner panel that form the vehicle body door; and
a triangularly shaped impact beam extension for mounting one end part of the impact beam to the inner panel, having an impact beam fixing part to which the impact beam is fixed and a load transmission part extending from the impact beam fixing part toward a centroid of the body pillar.

* * * * *